3,287,642
HIGH VOLTAGE MEASURING PROBES WITH INTERCONNECTING WIRE STORAGE REEL

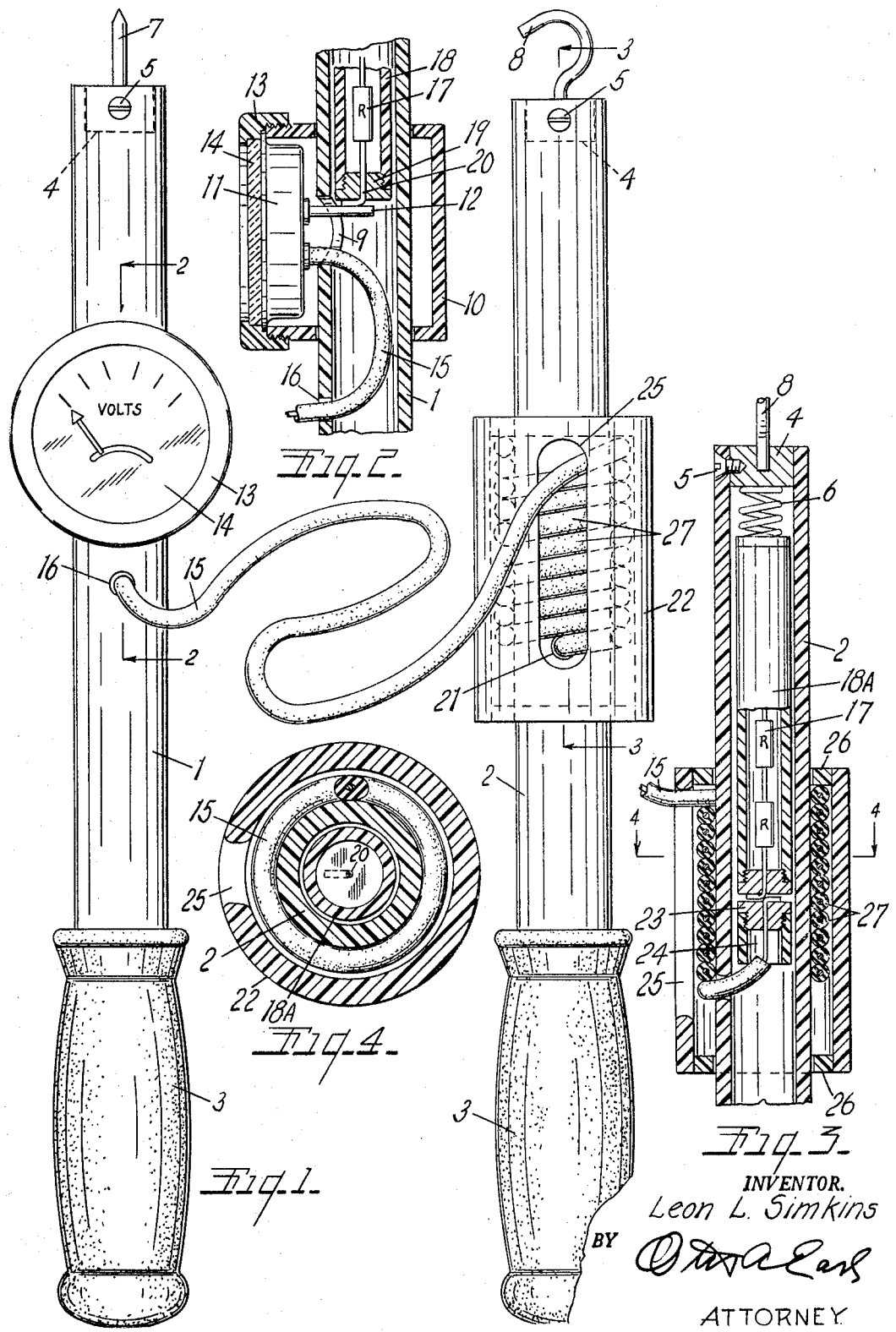

Leon L. Simkins, Kalamazoo, Mich., assignor to Hughes Aircraft Company, Culver City, Calif., a corporation of Delaware
Filed Mar. 19, 1962, Ser. No. 180,696
1 Claim. (Cl. 324—149)

This invention relates to improvements in high voltage test contact probe with connecting wire connection and winding reel.

The principal objects of this invention are:

First, to provide novel test rods for safely and manually connecting a voltage test instrument or other indicating device across high voltage transmission lines at various spacings.

Second, to provide novel wire contacting prods mounted on electrically insulating rods and electrically connected by a flexible conductor that can be wound up or payed out from one of the rods to provide variable spacing between the rods without a loose loop of the connecting wire hanging dangerously therebetween.

Third, to provide a novel test rod of insulating material having an electrical contact prod on one end and an insulated wire extending from an intermediate point along its length with a resistance element of selective value electrically connected between the prod and the wire.

Other objects and advantages of the invention will be apparent from a consideration of the following description and claim. The drawings, of which there is one sheet, illustrate a highly practical form of the test apparatus and the contact probes thereof.

FIG. 1 is an elevational view of the connected probes of the test apparatus.

FIG. 2 is a fragmentary longitudinal cross-sectional view taken along the plane of the line 2—2 in FIG. 1.

FIG. 3 is a fragmentary longitudinal cross-sectional view taken along the plane of the line 3—3 in FIG. 1.

FIG. 4 is a transverse cross-sectional view taken along the plane of the line 4—4 in FIG. 3.

In the construction, connection and repair of high voltage electrical transmission lines and equipment it is frequently necessary to determine if selected lines or wires are energized and at what voltage. The wires are frequently mounted on high poles and the test must be accomplished by a lineman standing on spurs near the top of the pole. It is therefore essential that the lineman be able to connect his test equipment to the high voltage lines without danger to himself and with a minimum inconvenience and danger from connecting parts of the apparatus itself. Rods or prods sometimes called hot sticks have been used to permit linemen to contact electrically energized circuits.

The present invention provides two hot sticks in the form of tubular rods 1 and 2 of good electrically insulating material such as synthetic plastic. The rods have hand grips 3 on their lower ends. In their outer or upper ends the rods have metallic contact blocks 4 secured therein by screws 5. The blocks have contact springs 6 on their inner ends and probes or line contacting elements on their outer ends. One probe is desirably a pointed pin 7 while the other contact element is a metal hook 8 permitting the rod connected thereto to be hung from a line wire being tested.

The rod 1 defines a first hole 9 in its side. A cylindrical housing 10 is slid over the rod 1 with its axis perpendicular to the rod. A volt meter 11 is positioned in the open end of the housing with a rigid contact terminal 12 projecting through the hole 9. A cap 13 and lens 14 secure the meter in the housing. An insulated lead wire 15 is connected to the meter and passed downwardly in the rod and out through a lower hole 16. The holes 9 and 16 are located about mid-way of the length of the rod.

The terminal 12 is electrically connected within the rod to the prod 7 by a series or string of resistors 17. The resistors are conveniently enclosed in a cylindrical casing or tube 18 with metal contact plugs 19 threaded in its ends. The lead wires 20 of the end resistors are passed through holes in the plugs and soldered. The lower plug rests on the terminal 12 and the spring 6 on the contact block 4 engages the plug on the other end of the casing.

The lead wire 15 is of any convenient length to permit the rods 1 and 2 to be connected between the widest spaced pair of transmission lines on which it is contemplated to use the apparatus. The wire is extended through a hole 21 formed mid-way of the length of the other rod 2. The wire passes through a winding sleeve 22 to be described. Within the rod 2, the wire 15 is connected electrically to a contact plug 23 threaded in a short collar 24 of insulating material. The connection is conveniently made by pushing the end of the wire out the end of the rod, slipping the collar over the wire and then connecting the plug to the wire. The collar is then threaded onto the plug and the wire drawn back through the hole 21 till the lower end of the collar rests on the wire where the wire protrudes through the rod. A second housing 18A containing a series of resistors 17 makes electrical contact between the plug 23 and the spring 6 on the connector block 4. The resistors in the housings or cartridges 18 and 18A may be of equal or different value depending on the use to which the apparatus is to be put.

The sleeve 22 has an axially extending slot 25 in its side through which the wire 15 extends. End collars 26 space the sleeve from the rod by a distance slightly greater than the thickness of the wire 15. The sleeve and the collars are freely rotatable and slidable on the rod 2 so the sleeve is supported on the wire where the wire passes through the slot 25.

When the rods are to be used on transmission wires or conductors that are spaced apart by a distance less than the length of the wire 15, the sleeve 22 is held stationary and the rod 2 is rotated within the sleeve. This winds the wire around the rod in coils 27 and takes up the excess wire so there is no loose loop to hang down in front of the lineman or make contact with other wires as he contacts the prods 7 and 8 with the selected transmission wires. It also provides convenient storage and protection for the wire when the apparatus is not in use. It should be noted that the opening 25 need not be on an elongated slot although the form illustrated provides a convenient viewing opening to see how many turns of the wire 15 are wound onto the rod. From this the approximate length of the wire between the rods can be mentally calculated. If the sleeve 22 is transparent or if it is not desired to view the number of turns on the rod, the slot 25 can be reduced to a hole or opening merely large enough to freely pass the wire 15.

The wire winding and storing sleeve has utility apart from the high voltage insulated prods or hot sticks. The winding sleeve 22 may be rotatably mounted around any tubular test instrument having a lead wire extending therefrom to coil up the wire around the tube.

What is claimed as new is:

Voltage test apparatus for high voltage transmission lines and equipment comprising a pair of elongated tubular rods of electrically insulating material having handle grips on their lower ends, a voltage indicating device supported intermediate of the ends of one of said rods and having terminals projecting into the rod, an insulated wire connected to a terminal of said device and extended through a hole in the side of said one rod and through another hole in the side of the other of said rods, a metallic contact block within said other rod connected to the other end of said wire, an annular collar of insulating material positioned around the lower end of said contact block and supported on said wire where the wire passes through said other rod, a wire coiling sleeve positioned around said other rod and defining a longitudinal slot passing said wire whereby the wire supports the sleeve on the rod, spacer rings in the ends of said sleeve freely rotatable about said other rod and spacing said sleeve from the rod by slightly more than the thickness of said wire whereby rotation of the sleeve on the rod causes the wire to pass through the slot and be wound around the rod within the sleeve, metal contact plugs removably secured in the upper ends of said rods, contact springs on the inner ends of said plugs, external contacts including a hook and a prod on the outer ends of said plugs, and cylindrical casings enclosing resistance elements mechanically supported within said rods and electrically connected between said springs and another terminal on said indicating device and said contact block.

References Cited by the Examiner
UNITED STATES PATENTS

| | | | |
|---|---|---|---|
| 1,153,829 | 9/1915 | Rueckert | 191—12.2 |
| 2,070,561 | 2/1937 | Cantor | 191—12.4 |
| 2,269,225 | 1/1942 | Rich | 324—149 |
| 2,332,208 | 10/1943 | Dow. | |
| 2,429,675 | 10/1947 | Eypper. | |
| 2,552,981 | 5/1951 | Lamb | 324—149 |
| 2,587,707 | 3/1952 | Dever | 191—12 |
| 3,193,765 | 7/1965 | Bevins | 324—72.5 X |

WALTER L. CARLSON, *Primary Examiner.*

R. V. ROLINEC, *Assistant Examiner.*